United States Patent
Le et al.

(10) Patent No.: US 9,036,293 B2
(45) Date of Patent: May 19, 2015

(54) DISK CLAMP AND LOCK

(71) Applicant: Seagate Technology LLC, Cupertino, CA (US)

(72) Inventors: Lynn Bich-Quy Le, San Jose, CA (US); Hans Leuthold, Santa Cruz, CA (US); Troy M. Herndon, San Jose, CA (US); Paco Gregor Flores, Felton, CA (US); Matthew M. McConnell, Scotts Valley, CA (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 13/853,939

(22) Filed: Mar. 29, 2013

(65) Prior Publication Data

US 2014/0293483 A1    Oct. 2, 2014

(51) Int. Cl.
*G11B 17/022* (2006.01)
*G11B 17/028* (2006.01)

(52) U.S. Cl.
CPC ........ *G11B 17/0284* (2013.01); *G11B 17/0287* (2013.01)

(58) Field of Classification Search
CPC ............. G11B 17/0287; G11B 17/038; G11B 25/043; G11B 17/02; G11B 33/08; G11B 33/121; G11B 17/022; G11B 17/0282; G11B 19/2045; G11B 17/028; G11B 17/0284
USPC ....................................................... 360/99.12
See application file for complete search history.

(56) References Cited

U.S. PATENT DOCUMENTS

| | | | | |
|---|---|---|---|---|
| 4,639,802 A | * | 1/1987 | Neubauer et al. | 360/98.08 |
| 5,101,306 A | * | 3/1992 | Johnson | 360/98.08 |
| 5,243,481 A | * | 9/1993 | Dunckley et al. | 360/99.08 |
| 5,249,090 A | * | 9/1993 | Fehse | 360/98.08 |
| 5,267,106 A | * | 11/1993 | Brue et al. | 360/98.08 |
| 5,528,434 A | * | 6/1996 | Bronshvatch et al. | 360/98.08 |
| 5,790,346 A | * | 8/1998 | Fletcher | 360/99.12 |
| 5,801,901 A | * | 9/1998 | Bryan et al. | 360/98.08 |
| 6,417,988 B1 | | 7/2002 | Renken et al. | |
| 6,567,238 B1 | * | 5/2003 | Renken et al. | 360/99.12 |
| 6,624,967 B1 | * | 9/2003 | Suwito | 360/98.08 |
| 6,757,132 B1 | * | 6/2004 | Watson et al. | 360/99.12 |
| 6,760,188 B2 | * | 7/2004 | Choo et al. | 360/99.12 |
| 6,807,721 B2 | * | 10/2004 | Choo et al. | 29/603.03 |
| 6,943,986 B2 | * | 9/2005 | Hanssen | 360/99.12 |
| 7,016,147 B2 | * | 3/2006 | Choo et al. | 360/99.12 |
| 7,215,509 B2 | * | 5/2007 | Ng | 360/99.12 |
| 7,379,267 B2 | | 5/2008 | Engesser et al. | |
| 7,823,270 B2 | | 11/2010 | Choo et al. | |
| 7,872,830 B2 | * | 1/2011 | Ruden et al. | 360/99.12 |
| 8,069,554 B2 | | 12/2011 | Ruden et al. | |
| 2006/0103975 A1 | * | 5/2006 | Tokumiya et al. | 360/99.12 |

* cited by examiner

*Primary Examiner* — Brian Miller (57) ABSTRACT

Provided herein is an apparatus, including a clamping means for clamping at least one disk onto a hub at a mounting point on the hub for the at least one disk, wherein the clamping means is configured to sit wholly above the at least one disk; a seat in an outer perimeter of the hub configured to receive the clamping means; and a locking means for locking the clamping means onto the hub.

8 Claims, 5 Drawing Sheets

DISK CLAMP AND LOCK

BACKGROUND

A hard disk drive ("HDD") includes one or more disks for storing digital data, which one or more disks are clamped to a spindle motor assembly for rotation during read-write operations. The conventional, screw-based disk clamp that is used to clamp the one or more disks to the spindle motor assembly requires a dedicated space for the clamp and the one or more screws used to fasten the disks to the spindle motor assembly. The height of the dedicated space required for the screw-based disk clamp takes an amount of length away from the bearing span of the spindle.

SUMMARY

Provided herein is an apparatus, including a clamping means for clamping at least one disk onto a hub at a mounting point on the hub for the at least one disk, wherein the clamping means is configured to sit wholly above the at least one disk; a seat in an outer perimeter of the hub configured to receive the clamping means; and a locking means for locking the clamping means onto the hub.

These and other aspects and features of the invention may be better understood with reference to the following drawings, description, and appended claims.

DESCRIPTION

Before embodiments of the invention are described in greater detail, it should be understood by persons having ordinary skill in the art to which the invention pertains that the invention is not limited to the particular embodiments described and/or illustrated herein, as elements in such embodiments may vary. It should likewise be understood that a particular embodiment described and/or illustrated herein has elements which may be readily separated from the particular embodiment and optionally combined with any of several other embodiments or substituted for elements in any of several other embodiments described herein.

It should also be understood by persons having ordinary skill in the art to which the invention pertains that the terminology used herein is for the purpose of describing embodiments of the invention, and the terminology is not intended to be limiting. Unless indicated otherwise, ordinal numbers (e.g., first, second, third, etc.) are used to distinguish or identify different elements or steps in a group of elements or steps, and do not supply a serial or numerical limitation on the elements or steps of the claimed invention, or embodiments thereof. For example, "first," "second," and "third" elements or steps need not necessarily appear in that order, and the claimed invention, or embodiments thereof, need not necessarily be limited to three elements or steps. It should also be understood that, unless indicated otherwise, any labels such as "left," "right," "front," "back," "top," "bottom," "forward," "reverse," "clockwise," "counter clockwise," "up," "down," or other similar terms such as "upper," "lower," "aft," "fore," "vertical," "horizontal," "proximal," "distal," and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

Unless defined otherwise, all technical and scientific terms used herein have the same meaning as commonly understood by persons of ordinary skill in the art to which the invention pertains.

Embodiments of the invention will now be described in greater detail.

Conventional HDDs (e.g., FIG. 3 and accompanying description herein below) typically include one or more data storage disks supported on a hub for rotation by a spindle motor assembly. The one or more data storage disks each have a central opening defining an inner diameter through which a spindle of the spindle motor assembly extends. Each disk is secured at its inner diameter to the hub in a fixed relation with the spindle, and each disk is supported such that its outer diameter is free from contact with other components. When the spindle is rotatably driven by the spindle motor, the one or more data storage disks rotate with the spindle.

In securing the one or more data storage disks to the hub, the disks are alternately stacked with spacer rings on the hub, defining the core of the disk stack. The disks of the disk stack are typically secured onto the hub by a disk clamp that fits over the top of the hub. Conventional HDDs typically use a screw-based disk clamp to secure the one or more data storage disks of the disk pack in place on the hub. The height of the dedicated space required for the screw-based disk clamp takes an amount of length away from the bearing span of the spindle, height that could instead be used to increase bearing span and, thus, gyro performance. Described herein are various embodiments of disk clamps that do not require screws and/or reclaim height-based space increasing bearing span.

Figure 1A:
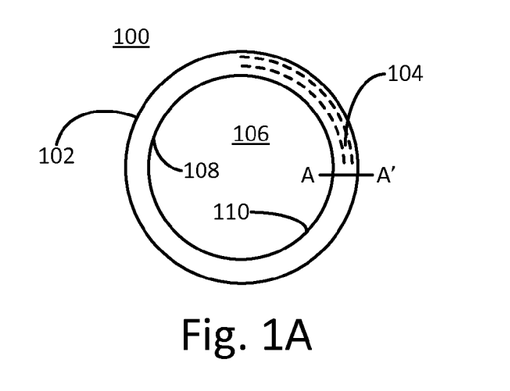
FIG. 1A provides a disk clamp in accordance with an embodiment.
Figure 1B:
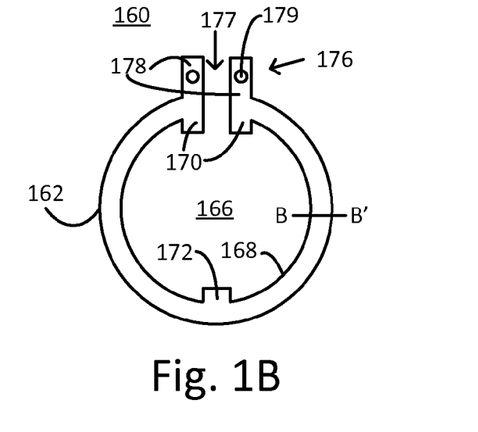
FIG. 1B provides a lock ring for use with a clamp ring in accordance with an embodiment.
Figure 1C:
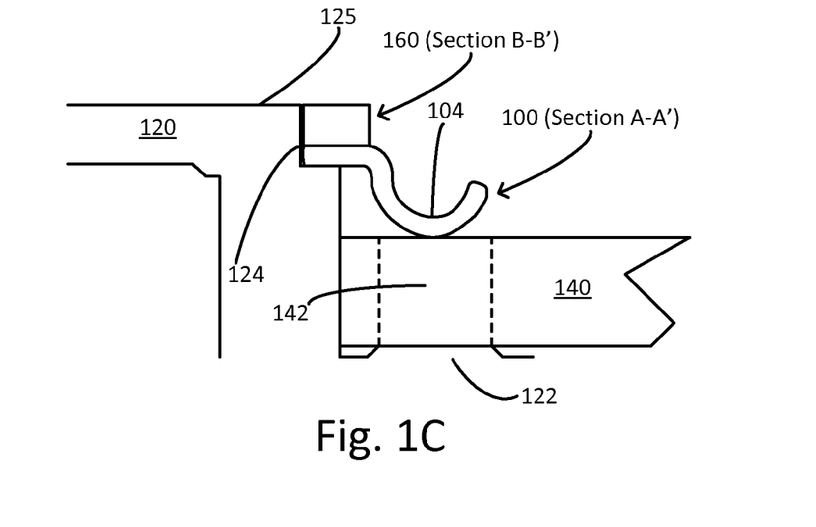
FIG. 1C provides a disk clamp and lock ring clamping a disk onto a hub in accordance with an embodiment.

A two-piece clamping device comprising a disk clamp 100 in combination with a lock ring 160 in accordance with FIG. 1A and FIG. 1B, respectively, may be used to secure a disk 140 onto a hub 120 at a mounting point on the hub as shown in FIG. 1C.

The disk clamp 100 of FIG. 1A may be an annular disk clamp comprising an outer perimeter 102, an inner annulus 104 comprising an annular trough, an inner lip 110 extending from a portion at or near the inner annulus, an inner opening 106, and an inner perimeter 108 of the inner opening, to which the inner lip 110 extends. With respect to the annular trough of the inner annulus 104 and the inner lip 110 of disk clamp 100, these features are shown in more detail in FIG. 1C along section A-A' of disk clamp 100.

The disk clamp 100 may be substantially non-compliant such that, in combination with the lock ring, the two-piece clamping device firmly clamps the disk in place at the mounting point on the hub. As discussed in more detail below in reference to FIG. 1C, in firmly clamping the disk in place at the mounting point on hub, the non-compliant inner lip 110 occupies an annular seat of the hub while the non-compliant annular trough of the inner annulus directly contacts an inner annulus of the disk being clamped.

In some embodiments, the disk clamp 100 of FIG. 1A and FIG. 1B may comprise a material having a relatively low thermal expansion coefficient including a volumetric coefficient no more than $70 \times 10^{-6}$ per $°$ C., such as no more than $55 \times 10^{-6}$ per $°$ C., for example, no more than $40 \times 10^{-6}$ per $°$ C., $35 \times 10^{-6}$ per $°$ C., or $30 \times 10^{-6}$ per $°$ C. In such embodiments, the thermal expansion coefficient may be relatively low in a temperature range from about 5$°$ C. to about 60$°$ C., a normal operating range for HDDs.

In some embodiments, the disk clamp may comprise a metal, optionally aluminum or steel. Plastic may also be used as a material for the disk clamp in some embodiments.

A lock ring that may be used with the foregoing disk clamp may be of the type shown in FIG. 1B. As shown, the lock ring 160 may be an annular lock ring comprising an outer perimeter 162, an inner opening 166, an inner perimeter 168 of the inner opening, and a lock 176 with a lock opening 177 for fitting the lock ring over the hub and onto the annular seat of the hub. Features associated the section B-B' of lock ring 160 are provided in more detail in FIG. 2C.

The lock ring may comprise flanges extending inward from the inner perimeter of the inner opening such as flanges 170 of the lock 176. The lock ring may further comprise a flange 172 directly across the lock ring from the lock 176 and the flanges 170. While three flanges are shown in FIG. 1B, the lock ring may comprise any number of flanges. In some embodiments, the lock ring comprises at least 3, 4, 5, 6, 7, 8, 9, 10, 11, or 12 flanges, or more. In such embodiments, the flanges may be evenly spaced about the inner perimeter of the lock ring. The flanges, which occupy voids in an outer perimeter of the hub when the lock ring is in place (e.g., locked in place atop disk clamp 100), are configured to stop slippage of the lock ring about the annular groove of the hub when the hub is in rotational motion.

With respect to the lock 176, the lock ring 160 further comprises tabs 178 of lock 176, which tabs extend outward from the outer perimeter 162, and which tabs include holes 179 for fastening two arms of the lock ring together and/or locking the lock ring onto the hub. Any of a number of different fasteners operable to fasten the two arms of the lock ring together may be used. Such fasteners include fasteners that may be fasten and unfasten, allowing for installation of the lock ring and removal of the lock ring, respectively.

In some embodiments, the lock ring 160 of FIG. 1B may comprise a metal, optionally aluminum or steel. Plastic may also be used as a material for the lock ring 160 in some embodiments.

FIG. 1C provides the disk clamp 100 of FIG. 1A in combination with the lock ring 160 of FIG. 1B securing a disk 140 onto a hub 120. As shown in FIG. 1C, the hub comprises an annular shoulder or seat 124 located in an outer perimeter of the hub, above a mounting point 122 for the disk 140 and below the topmost portion of the hub 125. The annular seat may accommodate the two-piece clamping device, in which device the lock ring 160 sits atop the disk clamp 100 in the annular seat.

The disk clamp 100 has a slightly larger inner perimeter 108 than the outer perimeter of the hub near the topmost portion 125 of the hub. As such, the disk clamp 100 may fit over the topmost portion 125 of the hub and onto the annular seat of the hub 124. In some embodiments, the disk clamp fits over the topmost portion 125 of the hub and onto the annular seat of the hub 124 by an interference fit, also known as a press fit or friction fit.

While in clamping position, the inner lip 110 of the disk clamp 100 rests on the annular seat of the hub, firmly gripping an outer perimeter of the hub as shown in FIG. 1C. Also while in clamping position, the annular trough of the inner annulus 104 of the disk clamp directly sits on an inner annulus 142 of the disk, clamping the disk 140 onto the mounting point 122 of the hub 120. As further shown in FIG. 1C, the bottom of the annular trough also sits below each of the outer perimeter and the inner perimeter of the disk clamp when in clamping position. And the whole disk clamp sits above the disk and below the lock ring 160.

The lock ring 160 has a slightly larger inner perimeter 168 than the outer perimeter of the hub near the topmost portion 125 of the hub. As such, the lock ring 160 may fit over the topmost portion 125 of the hub and onto the clamp ring 100 in the annular seat of the hub 124. Expanding the lock ring about the lock opening 177 may also allow the lock ring to fit over the topmost portion 125 of the hub and onto the clamp ring 100 in the annular seat of the hub 124.

While in locking position, the lock ring 160 sits atop the disk clamp 100 in the annular seat of the hub, firmly gripping an outer perimeter of the hub and locking the disk clamp in position. Inward-extending flanges 170/172 may also occupy voids within the outer perimeter of the hub when in locking position. Also while in locking position, the two arms of the lock ring may be fastened together through tabs 178 and tab holes 179, locking the lock ring onto the hub. Such a two-piece clamping system applies a uniform pressure on an inner annulus of the disk directly overlying the mounting point.

With respect to the installation (or removal) of the disk clamp, a tool configured to interface with the disk clamp may be operable to pick up the disk clamp, center the disk clamp with respect to the hub, lower the disk clamp onto the hub, and provide uniform pressure around the inner lip of the disk clamp while pressing the disk clamp onto the annular seat of the hub.

With respect to the installation (or removal) of the lock ring, a tool configured to interface with the lock ring may be operable to pick up the lock ring, insert a first flange (e.g., flange 172) into a first void within the outer perimeter of the hub, insert a first arm and flange of the lock ring into a second void within the outer perimeter of the hub while holding a second arm, insert a second arm and flange of the lock ring into a third void within the outer perimeter of the hub, and release the lock ring for locking.

With respect to clamping a disk onto a hub using the foregoing two-piece clamping device of FIG. 1C, such clamping comprises, in some embodiments, lowering the disk to be clamped over the topmost portion of the hub and onto the mounting point of the hub; centering the disk clamp with respect to the hub; lowering the disk clamp onto the topmost portion of the hub; pressing the disk clamp over the topmost portion of the hub and onto each of an annular seat of the hub and an inner annulus of a disk; inserting a first flange into a first void within the outer perimeter of the hub; inserting a first arm and flange of the lock ring into a second void within the outer perimeter of the hub; inserting the second arm and flange of the lock ring into a third void within the outer perimeter of the hub; and locking the lock ring to clamp the disk onto the hub at the mounting point. With respect to unclamping and removing a disk from a hub, such unclamping and removing comprises, in some embodiments, unlocking the lock ring; removing the second arm and flange of the lock ring from a third void within the outer perimeter of the hub; removing the first arm and flange of the lock ring from a second void within the outer perimeter of the hub; removing any remaining flanges form any voids within the outer perimeter of the hub, removing the lock ring; raising the disk clamp over the topmost portion of the hub to remove the disk clamp; and raising the disk over the topmost portion of the hub to remove the disk.

Figure 2A:
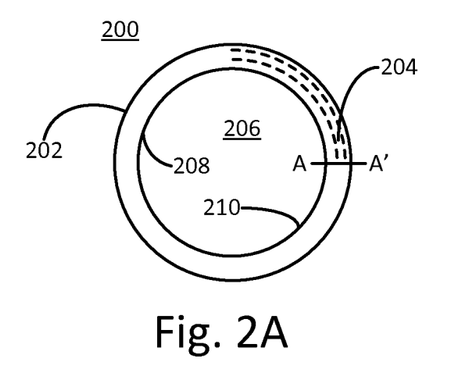
FIG. 2A provides a disk clamp in accordance with an embodiment.
Figure 2B:
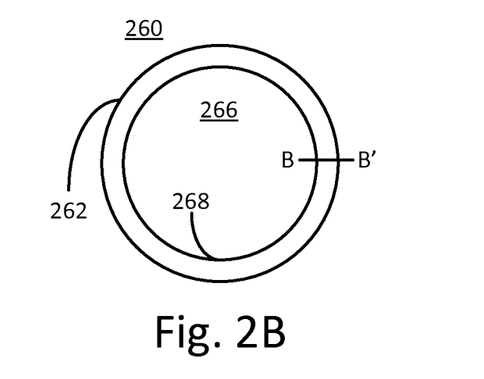
FIG. 2B provides a lock ring for use with a clamp ring in accordance with an embodiment.
Figure 2C:
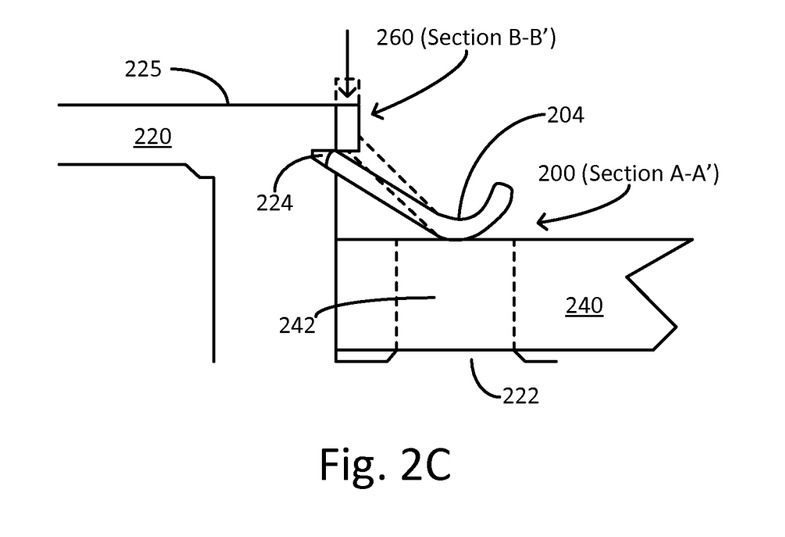
FIG. 2C provides a lock ring operating on a disk clamp to clamp a disk onto a hub in accordance with an embodiment.

A two-piece clamping device comprising a disk clamp 200 in combination with a lock ring 260 in accordance with FIG. 2A and FIG. 2B, respectively, may be used to secure a disk 240 onto a hub 220 at a mounting point on the hub as shown in FIG. 2C.

The disk clamp 200 of FIG. 2A may be an annular disk clamp comprising an outer perimeter 202, an inner annulus 204 comprising an annular trough, an inner lip 210 extending from a portion at or near the inner annulus, an inner opening 206, and an inner perimeter 208 of the inner opening, to which the inner lip 210 extends. With respect to the annular trough of the inner annulus 204 and the inner lip 210 of disk clamp 200, these features are shown in more detail in FIG. 2C along section A-A' of disk clamp 200.

The disk clamp 200 may be substantially non-compliant; however, in some embodiments, the disk clamp 200 may have a compliant portion and a non-compliant portion. Whether substantially non-compliant or including a compliant portion, the inner perimeter 208 of the disk clamp may be slightly larger than the outer perimeter of the hub to allow for an appropriate fit (e.g., interference fit and/or shrink fit). In embodiments in which the disk clamp is substantially non-compliant, the disk clamp may fit over a topmost portion of a hub by an interference fit or shrink fit (i.e., heat the disk clamp to expand; cool the disk clamp to contract). With respect to embodiments in which the disk clamp 200 comprises a compliant portion and a non-compliant portion, the compliant portion of the disk clamp may fit over a topmost portion of a hub by an interference fit or shrink fit. The compliant portion of the disk clamp includes inner lip 210, which extends from a region at or near the inner annulus 204 to the inner perimeter, and the non-compliant portion includes the remainder of the disk clamp, including the inner annulus 204 comprising the annular trough. The compliant portion of the disk clamp, which may be notched (e.g., to form tabs) to allow for greater expansion of the inner perimeter 208 and/or inner lip 210, is operable to fit over a topmost portion of a hub and, subsequently, into an annular groove of the hub. Whether substantially non-compliant or including a compliant portion, the inner perimeter 208 and a small portion of the inner lip 210 of the disk clamp 200 may occupy an annular groove of the hub while the non-compliant annular trough of the inner annulus 204 may directly contacts an inner annulus of a disk.

In some embodiments, the disk clamp 200 of FIG. 2A and FIG. 2B may comprise a material having a relatively low thermal expansion coefficient including a volumetric coefficient no more than $70 \times 10^{-6}$ per $^\circ$ C., such as no more than $55 \times 10^{-6}$ per $^\circ$ C., for example, no more than $40 \times 10^{-6}$ per $^\circ$ C., $35 \times 10^{-6}$ per $^\circ$ C., or $30 \times 10^{-6}$ per $^\circ$ C. In such embodiments, the thermal expansion coefficient may be relatively low in a temperature range from about 5$^\circ$ C. to about 60$^\circ$ C., a normal operating range for HDDs. In some embodiments, the thermal expansion coefficient of the disk clamp 200 allows for the disk clamp to fit over an outer perimeter of a hub of a HDD when the disk clamp is heated (e.g., for shrink fitting). As such, a disk clamp may be configured to clamp at least one disk onto a hub at a mounting point for the at least one disk on the hub by means of a temperature-dependent material configured to expand upon heating and to contract upon cooling.

In some embodiments, the disk clamp may comprise a metal, optionally aluminum or steel. Plastic may also be used as a material for the disk clamp in some embodiments.

A lock ring that may be used with the foregoing disk clamp may be of the type shown in FIG. 2B. As shown, the lock ring 260 may be an annular lock ring comprising an outer perimeter 262, an inner opening 266, an inner perimeter 268 of the inner opening. Features associated the section B-B' of lock ring 260 are provided in more detail in FIG. 2C.

The lock ring 260 having an inner perimeter 268 that is slightly larger than an outer perimeter of a hub allows for different fittings. For example, having an inner perimeter that is slightly larger than an outer perimeter of a hub allows for an interference fit of the lock ring on the hub. Having an inner perimeter that is slightly larger than an outer perimeter of a hub also allows for a shrink fit (i.e., heat the disk clamp to expand; cool the disk clamp to contract).

The lock ring 260 of FIG. 2B may comprise a material having a relatively low thermal expansion coefficient including a volumetric coefficient no more than $70 \times 10^{-6}$ per $^\circ$ C., such as no more than $55 \times 10^{-6}$ per $^\circ$ C., for example, no more than $40 \times 10^{-6}$ per $^\circ$ C., $35 \times 10^{-6}$ per $^\circ$ C., or $30 \times 10^{-6}$ per $^\circ$ C. In such embodiments, the thermal expansion coefficient may be relatively low in a temperature range from about 5$^\circ$ C. to about 60$^\circ$ C., a normal operating range for HDDs. In some embodiments, the thermal expansion coefficient of the lock ring 260 allows for the lock ring to fit over an outer perimeter of a hub when the lock ring is heated (e.g., for shrink fitting). As such, a lock ring may be configured to lock a clamp onto a hub by means of a temperature-dependent material configured to expand upon heating and to contract upon cooling.

In some embodiments, the lock ring 160 of FIG. 1B may comprise a metal, optionally aluminum or steel. Plastic may also be used as a material for the lock ring 160 in some embodiments.

FIG. 2C provides the disk clamp 200 of FIG. 2A in combination with the lock ring 260 of FIG. 2B securing a disk 240 onto a hub 220. As shown in FIG. 2C, the hub comprises an annular groove 224 located in an outer perimeter of the hub, above a mounting point 222 for the disk 240 and below the topmost portion of the hub 225. The annular groove may accommodate the disk clamp (i.e., inner perimeter and/or small portion of inner lip 210 of disk clamp) of the two-piece clamping device, in which device the lock ring 260 sits atop the disk clamp 200 locking the disk clamp onto the hub.

As described above, the disk clamp 200 may have a slightly larger inner perimeter 208 than the outer perimeter of the hub near the topmost portion 225 of the hub. As such, the disk clamp 200 may fit over the topmost portion 225 of the hub and into the annular groove of the hub 224 by an interference fit. A shrink fit for the lock ring may also be used to fit the disk clamp onto the hub.

While in clamping position, the inner lip 210 of the disk clamp 200 occupies the annular groove in an outer perimeter of the hub. Also while in clamping position, the annular trough of the inner annulus 204 of the disk clamp directly sits on an inner annulus 242 of the disk, clamping the disk 240 onto the mounting point 222 of the hub 220. As further shown in FIG. 2C, the bottom of the annular trough also sits below each of the outer perimeter and the inner perimeter of the disk clamp when in clamping position. And the whole disk clamp sits above the disk and below the lock ring 260.

As described above, the lock ring 260 has a slightly larger inner perimeter 268 than the outer perimeter of the hub near the topmost portion 225 of the hub. As such, the lock ring 260 may fit over the topmost portion 225 of the hub and secure the clamp ring 200 in the annular groove of the hub 224.

While in locking position, the lock ring 260 sits atop the disk clamp 200 at the topmost portion of the hub, firmly gripping an outer perimeter of the hub and locking the disk clamp in position. Such a two-piece clamping system applies a uniform pressure on an inner annulus of the disk directly overlying the mounting point for the disk.

With respect to the installation (or removal) of the disk clamp, a tool configured to interface with the disk clamp may be operable to pick up the disk clamp, center the disk clamp with respect to the hub, lower the disk clamp onto the hub, and provide uniform pressure around the inner lip of the disk clamp while pressing the disk clamp onto the annular seat of the hub. The tool may be further configured to handle the disk clamp during heat-related processes related to shrink fitting the disk clamp onto the hub.

With respect to the installation (or removal) of the lock ring, a tool configured to interface with the lock ring may be operable to pick up the lock ring, center the lock ring with respect to the hub, lower the lock ring onto the hub, and provide uniform pressure around the lock ring while pressing the lock ring onto the hub. The tool may be further configured to handle the lock ring during heat-related processes related to shrink fitting the lock ring onto the hub.

With respect to clamping a disk onto a hub using the foregoing two-piece clamping device of FIG. 2C, such clamping comprises, in some embodiments, lowering the disk to be clamped over the topmost portion of the hub and onto the mounting point of the hub; centering the disk clamp with respect to the hub; lowering the disk clamp onto the topmost portion of the hub; pressing the disk clamp over the topmost portion of the hub, into an annular groove of the hub, and onto an inner annulus of a disk; centering the lock ring with respect to the hub; lowering the lock ring onto the topmost portion of the hub; pressing the lock ring over the topmost portion of the hub and onto the disk clamp; and locking the disk clamp, securing the disk onto the hub at the mounting point. In such embodiments, the disk clamp, the lock ring, or both the disk clamp and the lock ring may be heated prior to pressing the disk clamp, the lock ring, or both the disk clamp over the topmost portion of the hub.

Clamping a disk onto a hub using the foregoing two-piece clamping device of FIG. 2C, may also comprise, in some embodiments, lowering the disk to be clamped over the topmost portion of the hub and onto the mounting point of the hub; centering the disk clamp with respect to the hub; lowering the disk clamp onto the topmost portion of the hub; centering the lock ring with respect to the hub; lowering the lock ring onto the topmost portion of the hub; and pressing the lock ring and disk clamp, in combination, over the topmost portion of the hub and onto an inner annulus of a disk, securing the disk onto the hub at the mounting point. In such embodiments, the disk clamp, the lock ring, or both the disk clamp and the lock ring may be heated prior to pressing the disk clamp, the lock ring, or both the disk clamp over the topmost portion of the hub.

Clamping a disk onto a hub using the foregoing two-piece clamping device of FIG. 2C, may also comprise, in some embodiments, lowering the disk to be clamped over the topmost portion of the hub and onto the mounting point of the hub; centering a combination of the lock ring and the disk clamp with respect to the hub; lowering the combination of the lock ring and the disk clamp onto the topmost portion of the hub; and pressing the lock ring and disk clamp over the topmost portion of the hub and onto an inner annulus of a disk, securing the disk onto the hub at the mounting point. In such embodiments, the disk clamp, the lock ring, or both the disk clamp and the lock ring may be heated prior to pressing the combination of the lock ring and the disk clamp over the topmost portion of the hub.

With respect to unclamping and removing a disk from a hub, such unclamping and removing comprises, in some embodiments, removing the lock ring by raising the lock ring over the topmost portion of the hub, optionally by first heating the lock ring to expand the lock ring; removing the disk clamp by raising the disk clamp over the topmost portion of the hub to remove the disk clamp, optionally by first heating the disk clamp to expand the disk clamp; and raising the disk over the topmost portion of the hub to remove the disk.

Having described the two-piece clamping devices provided in FIGS. 1A-1C and FIGS. 2A-2C, a person having ordinary skill in the art will recognize that, with some modification, the lock ring 260 of FIG. 2B may be used with the disk clamp 100 of FIG. 1A and FIG. 1C. In such an embodiment, the dimensions of the lock ring 260 of FIG. 2B may be adjusted (e.g., decreased inner perimeter; increased width) such that the lock ring 260 may sit atop the disk clamp 100 in the annular seat 124 of the hub 120, securing a disk to the hub. Such a modification would not need voids in the hub like those for the lock ring of FIG. 1B, as the lock ring may use an interference fit or shrink fit.

Figure 3A:
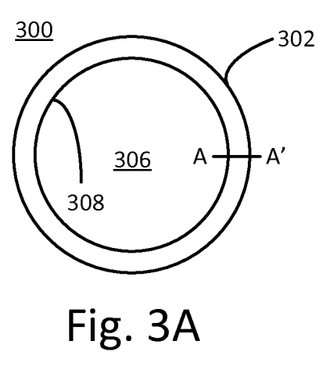
FIG. 3A provides a disk clamp in accordance with an embodiment.
Figure 3B:
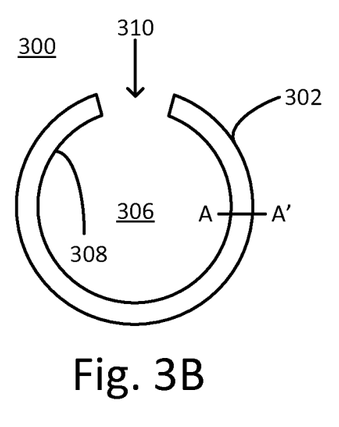
FIG. 3B provides a disk clamp in accordance with an embodiment.
Figure 3C:
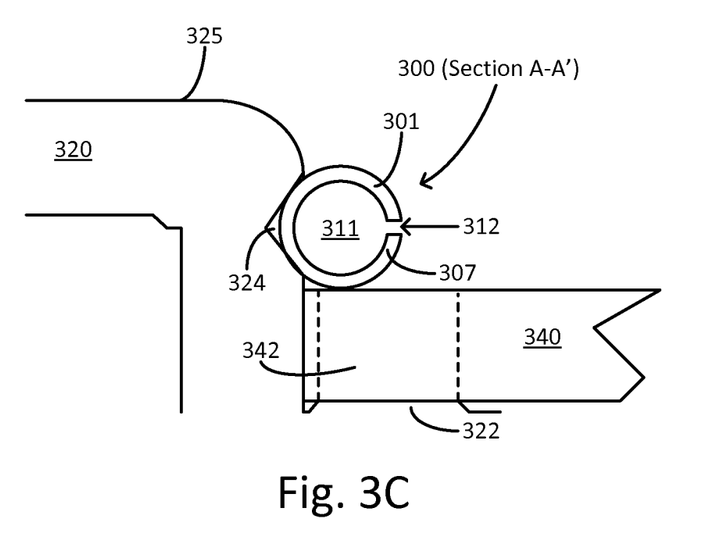
FIG. 3C provides a disk clamp clamping a disk onto a hub in accordance with an embodiment.

The disk clamp of FIG. 3A may be used to clamp and/or lock a disk onto a hub as shown in FIG. 3C. The disk clamp 300 of FIG. 3A may be an annular disk clamp comprising an outer perimeter 302, an inner opening 306, and an inner perimeter 308 of the inner opening. Section A-A' of disk clamp 300, a cross section from the inner perimeter to the outer perimeter of the disk clamp, is provided in FIG. 3C. As shown, the disk clamp 300 further comprises a top portion 301, a bottom portion 307, a hollow space 311, and a circumferential opening 312. The inner perimeter 308 of the disk clamp of FIG. 3A may be slightly larger than the outer perimeter of the hub to allow for an appropriate fit (e.g., interference fit and/or shrink fit) on the hub.

Alternatively, the disk clamp of FIG. 3B may be used to clamp and/or lock a disk onto a hub as shown in FIG. 3C. The disk clamp 300 of FIG. 3B may be an annular disk clamp comprising an outer perimeter 302, an inner opening 306, an inner perimeter 308 of the inner opening, and a disk clamp opening 310. Section A-A' of disk clamp 300, a cross section from the inner perimeter to the outer perimeter of the disk clamp, is provided in FIG. 3C. As shown, the disk clamp 300 further comprises a top portion 301, a bottom portion 307, an inner space 311), and a circumferential opening 312. The disk clamp may be compliant such that the disk clamp may be opened (e.g., mechanically expanded) at the disk clamp opening 310 during installation (or removal) of the disk clamp.

Each of the disk clamps provided in FIG. 3A and FIG. 3B may comprise a material having a relatively low thermal expansion coefficient including a volumetric coefficient no more than $70 \times 10^{-6}$ per °C., such as no more than $55 \times 10^{-6}$ per °C., for example, no more than $40 \times 10^{-6}$ per °C., $35 \times 10^{-6}$ per °C., or $30 \times 10^{-6}$ per °C. In such embodiments, the thermal expansion coefficient may be relatively low in a temperature range from about 5° C. to about 60° C., a normal operating range for HDDs. The thermal expansion coefficient of the disk clamp allows for the disk clamp to fit over an outer perimeter of a hub of a HDD when the disk clamp is heated (e.g., for shrink fitting). As such, a disk clamp may be configured to clamp and/or lock at least one disk onto a hub at a mounting point for the at least one disk on the hub by means of a temperature-dependent material configured to expand upon heating and to contract upon cooling.

Each of the disk clamps provided in FIG. 3A and FIG. 3B may comprise a metal, optionally aluminum or steel. Plastic may also be used as a material for the disk clamp in some embodiments.

FIG. 3C provides a disk clamp 300 of FIG. 3A or FIG. 3B securing a disk 340 onto a hub 320. As shown, the hub comprises an annular groove 324 located in an outer perimeter of the hub, above a mounting point 322 for the disk and below the topmost portion of the hub 325. The disk clamp 300 fits over the topmost portion 325 of the hub by an interference fit, a shrink fit, or, with respect to the disk clamp of FIG. 3B, when the disk clamp is opened at disk clamp opening 310. While in clamping position as shown in FIG. 3C, the inner perimeter and portions of the disk clamp adjacent to the inner perimeter (e.g., top and bottom portions on the inside the disk clamp) occupy the annular groove of the hub. The circumferential opening 312 of the disk clamp may be narrower (i.e., top portion 301 and bottom portion 307 may be closer together) when the disk clamp is in clamping position than when the disk clamp is not in clamping position, a result of loads applied to the disk clamp by the annular groove of the hub. Such loads may result from, for example, the annular groove having a slightly larger perimeter than the inner perimeter of the disk clamp, the annular groove, in cross section as shown in FIG. 3C, having a radius of curvature smaller/tighter than that of a cross section of the disk clamp, or from a combination of the foregoing. Also while in clamping position, the bottom portion 307 of the disk clamp directly contacts an inner annulus 342 of the disk, applying a uniform pressure on an inner annulus of the disk directly overlying the mounting point 322.

With respect to the installation (or removal) of the disk clamp of FIG. 3A or FIG. 3B, a tool configured to interface with the disk clamp may be operable to pick up the disk clamp, center the disk clamp with respect to the hub, lower the disk clamp onto the hub, and provide uniform pressure around the disk clamp while pressing the disk clamp onto the hub. The tool may be further configured to handle the disk clamp during heat-related processes related to shrink fitting the disk clamp onto the hub. The tool may alternatively be configured to pick up the disk clamp of FIG. 3B, open the disk clamp at the disk clamp opening 310, lower the opened disk clamp over the hub, and release the disk clamp such that the inner perimeter of the disk clamp may occupy the annular groove of the hub and clamp the disk onto the hub.

With respect to clamping a disk onto a hub using the disk clamp of either FIG. 3A or FIG. 3B, such clamping comprises, in some embodiments, lowering the disk to be clamped over the topmost portion of the hub and onto the mounting point of the hub; centering the disk clamp with respect to the hub; lowering the disk clamp onto the topmost portion of the hub; pressing the disk clamp over the topmost portion of the hub, into an annular groove of the hub, and onto an inner annulus of a disk, securing the disk onto the hub at the mounting point. In such embodiments, the disk clamp may be heated prior to pressing the disk clamp over the topmost portion of the hub. With respect to unclamping and removing a disk from a hub, such unclamping and removing comprises, in some embodiments, removing the disk clamp of FIG. 3A or FIG. 3B by raising the disk clamp over the topmost portion of the hub to remove the disk clamp, optionally by first heating the disk clamp to expand the disk clamp; and raising the disk over the topmost portion of the hub to remove the disk.

With respect to clamping a disk onto a hub using the disk clamp shown in FIG. 3B, such clamping comprises, in some embodiments, lowering the disk to be clamped over the topmost portion of the hub and onto the mounting point of the hub; opening the disk clamp at the disk clamp opening; lowering the disk clamp over the topmost portion of the hub and onto an inner annulus of a disk; and releasing the disk clamp such that the inner perimeter of the disk clamp occupies the annular groove of the hub. With respect to unclamping and removing a disk from the hub, such unclamping and removing comprises, in some embodiments, opening the disk clamp of FIG. 3B at the disk clamp opening 310; raising the disk clamp over the topmost portion of the hub and removing the disk clamp; and raising the disk over the topmost portion of the hub and removing the disk.

Figure 4A:
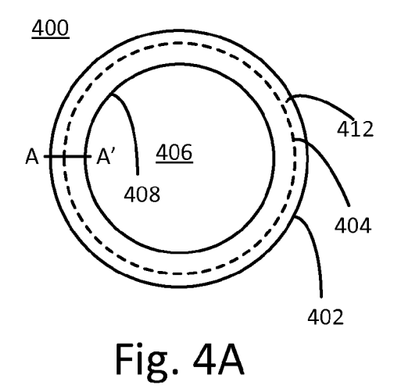
FIG. 4A provides a disk clamp in accordance with an embodiment.
Figure 4B:
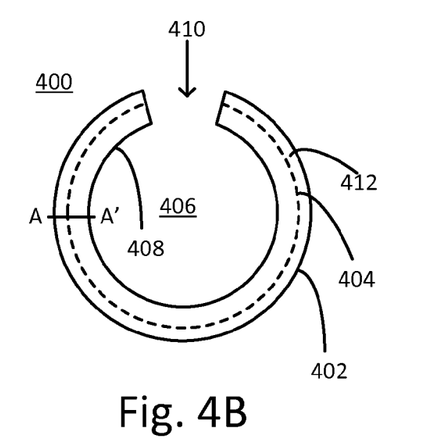
FIG. 4B provides a disk clamp in accordance with an embodiment.
Figure 4C:
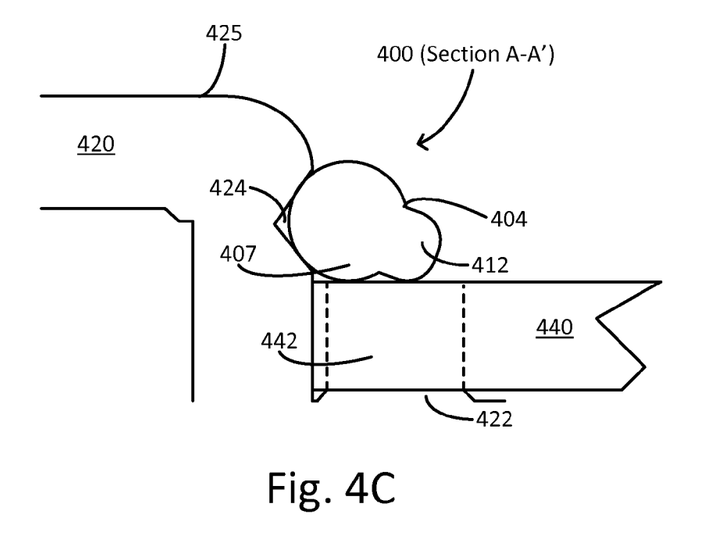
FIG. 4C provides a disk clamp clamping a disk onto a hub in accordance with an embodiment.

The disk clamp of FIG. 4A may be used to clamp and/or lock a disk onto a hub as shown in FIG. 4C. The disk clamp 400 of FIG. 4A may be an annular disk clamp comprising an outer perimeter 402, an inner opening 406, and an inner perimeter 408 of the inner opening. Section A-A' of disk clamp 400, a cross section from the inner perimeter to the outer perimeter of the disk clamp, is provided in FIG. 4C. As shown, the disk clamp further comprises a protrusion 412, which protrusion extends from an inner annulus 404 of the disk clamp (see FIG. 4B for inner annulus 404). The inner perimeter 408 of the disk clamp of FIG. 4A may be slightly larger than the outer perimeter of the hub to allow for an appropriate fit (e.g., interference fit and/or shrink fit) on the hub.

Alternatively, the disk clamp of FIG. 4B may be used to clamp and/or lock a disk onto a hub as shown in FIG. 4C. The disk clamp 400 of FIG. 4B may be an annular disk clamp comprising an outer perimeter 402, an inner opening 406, an inner perimeter 408 of the inner opening, and a disk clamp opening 410. Section A-A' of disk clamp 400, a cross section from the inner perimeter to the outer perimeter of the disk clamp, is provided in FIG. 4C. As shown, the disk clamp further comprises a protrusion 412, which protrusion extends from an inner annulus 404 of the disk clamp (see FIG. 4B for inner annulus 404). The disk clamp may be compliant such that the disk clamp may be opened (e.g., mechanically expanded) at the disk clamp opening 410 during installation (or removal) of the disk clamp.

Each of the disk clamps provided in FIG. 4A and FIG. 4B may comprise a material having a relatively low thermal expansion coefficient including a volumetric coefficient no more than $70 \times 10^{-6}$ per ° C., such as no more than $55 \times 10^{-6}$ per ° C., for example, no more than $40 \times 10^{-6}$ per ° C., $35 \times 10^{-6}$ per ° C., or $30 \times 10^{-6}$ per ° C. In such embodiments, the thermal expansion coefficient may be relatively low in a temperature range from about 5° C. to about 60° C., a normal operating range for HDDs. The thermal expansion coefficient of the disk clamp allows for the disk clamp to fit over an outer perimeter of a hub of a HDD when the disk clamp is heated (e.g., for shrink fitting). As such, a disk clamp may be configured to clamp and/or lock at least one disk onto a hub at a mounting point for the at least one disk on the hub by means of a temperature-dependent material configured to expand upon heating and to contract upon cooling.

Each of the disk clamps provided in FIG. 4A and FIG. 4B may comprise a metal, optionally aluminum or steel. Plastic may also be used as a material for the disk clamp in some embodiments.

FIG. 4C provides a disk clamp 400 of FIG. 4A or FIG. 4B securing a disk 440 onto a hub 420. As shown, the hub comprises an annular groove 424 located in an outer perimeter of the hub, above a mounting point 422 for the disk and below the topmost portion of the hub 425. The disk clamp 400 fits over the topmost portion 425 of the hub by an interference fit, a shrink fit, or, with respect to the disk clamp of FIG. 4B, when the disk clamp is opened at disk clamp opening 410. While in clamping position as shown in FIG. 4C, the inner perimeter and portions of the disk clamp adjacent to the inner perimeter (e.g., top and bottom portions on the inside the disk clamp) occupy the annular groove of the hub while a bottom portion 407 of the disk clamp and the protrusion 412 directly contact an inner annulus 442 of the disk. Also while in clamping position, the disk clamp applies a uniform pressure on the inner annulus 442 of the disk directly overlying the mounting point 422.

With respect to the installation (or removal) of the disk clamp of FIG. 4A or FIG. 4B, a tool configured to interface with the disk clamp may be operable to pick up the disk clamp, center the disk clamp with respect to the hub, lower the disk clamp onto the hub, and provide uniform pressure around the disk clamp while pressing the disk clamp onto the hub. The tool may be further configured to handle the disk clamp during heat-related processes related to shrink fitting the disk clamp onto the hub. The tool may alternatively be configured to pick up the disk clamp of FIG. 4B, open the disk clamp at the disk clamp opening 410, lower the opened disk clamp over the hub, and release the disk clamp such that the inner perimeter of the disk clamp may occupy the annular groove of the hub and clamp the disk onto the hub.

With respect to clamping a disk onto a hub using the disk clamp of either FIG. 4A or FIG. 4B, such clamping comprises, in some embodiments, lowering the disk to be clamped over the topmost portion of the hub and onto the mounting point of the hub; centering the disk clamp with respect to the hub; lowering the disk clamp onto the topmost portion of the hub; pressing the disk clamp over the topmost portion of the hub, into an annular groove of the hub, and onto an inner annulus of a disk, securing the disk onto the hub at the mounting point. In such embodiments, the disk clamp may be heated prior to pressing the disk clamp over the topmost portion of the hub. With respect to unclamping and removing a disk from a hub, such unclamping and removing comprises, in some embodiments, removing the disk clamp of FIG. 4A or FIG. 4B by raising the disk clamp over the topmost portion of the hub to remove the disk clamp, optionally by first heating the disk clamp to expand the disk clamp; and raising the disk over the topmost portion of the hub to remove the disk.

With respect to clamping a disk onto a hub using the disk clamp shown in FIG. 4B, such clamping comprises, in some embodiments, lowering the disk to be clamped over the topmost portion of the hub and onto the mounting point of the hub; opening the disk clamp at the disk clamp opening; lowering the disk clamp over the topmost portion of the hub and onto an inner annulus of a disk; and releasing the disk clamp such that the inner perimeter of the disk clamp occupies the annular groove of the hub. With respect to unclamping and removing a disk from the hub, such unclamping and removing comprises, in some embodiments, opening the disk clamp of FIG. 4B at the disk clamp opening 410; raising the disk clamp over the topmost portion of the hub and removing the disk clamp; and raising the disk over the topmost portion of the hub and removing the disk.

Figure 5:
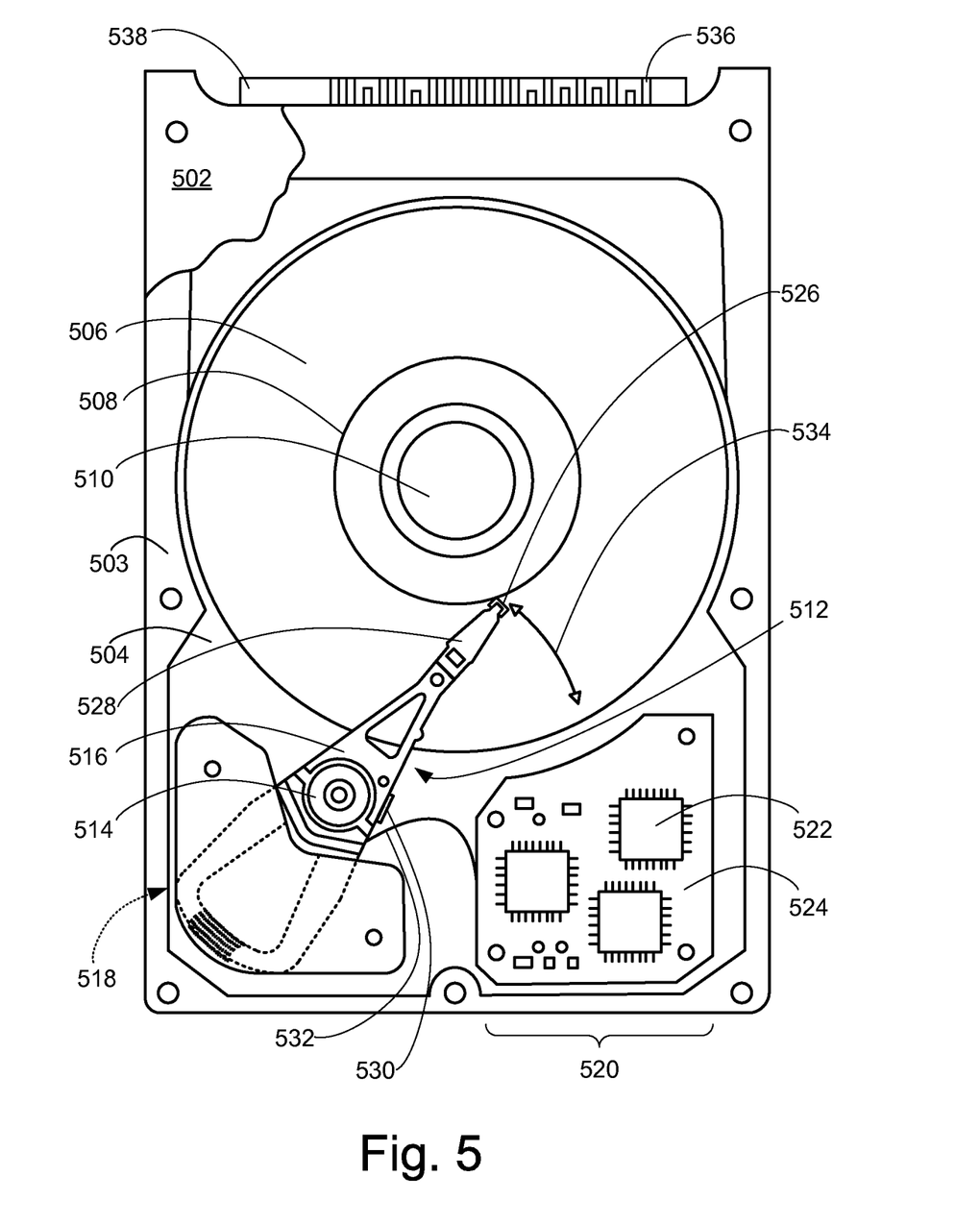
FIG. 5 provides a conventional HDD in which embodiments of one or more disk clamps may be used.

FIG. 5 is a plan view of a hard disk drive 500, which hard disk drive may use the a disk clamp described herein. Hard disk drive 500 may include a housing assembly comprising a cover 502 that mates with a base deck having a frame 503 and a floor 504, which housing assembly provides a protective space for various hard disk drive components. The hard disk drive 500 includes one or more data storage disks 506 of computer-readable data storage media. Typically, both of the major surfaces of each data storage disk 506 include a plurality of concentrically disposed tracks for data storage purposes. Each data storage disk 506 is mounted on a hub 508, which in turn is rotatably interconnected with the base deck and/or cover 502. Multiple data storage disks 506 are typically mounted in vertically spaced and parallel relation on the hub 508. A spindle motor assembly 510 rotates the data storage disks 506.

The hard disk drive 500 also includes an actuator arm assembly 512 that pivots about a pivot bearing 514, which in turn is rotatably supported by the base deck and/or cover 502. The actuator arm assembly 512 includes one or more individual rigid actuator arms 516 that extend out from near the pivot bearing 514. Multiple actuator arms 516 are typically disposed in vertically spaced relation, with one actuator arm 516 being provided for each major data storage surface of each data storage disk 506 of the hard disk drive 500. Other types of actuator arm assembly configurations could be utilized as well, an example being an "E" block having one or more rigid actuator arm tips, or the like, that cantilever from a common structure. Movement of the actuator arm assembly 512 is provided by an actuator arm drive assembly, such as a voice coil motor 518 or the like. The voice coil motor 518 is a magnetic assembly that controls the operation of the actuator arm assembly 512 under the direction of control electronics 520. The control electronics 520 may include a plurality of integrated circuits 522 coupled to a printed circuit board 524. The control electronics 520 may be coupled to the voice coil motor assembly 518, a slider 526, or the spindle motor assembly 510 using interconnects that can include pins, cables, or wires (not shown).

A load beam or suspension 528 is attached to the free end of each actuator arm 516 and cantilevers therefrom. Typically, the suspension 528 is biased generally toward its corresponding data storage disk 506 by a spring-like force. The slider 526 is disposed at or near the free end of each suspension 528. What is commonly referred to as the read-write head (e.g., transducer) is appropriately mounted as a head unit (not shown) under the slider 526 and is used in hard disk drive read/write operations. The head unit under the slider 526 may utilize various types of read sensor technologies such as anisotropic magnetoresistive (AMR), giant magnetoresistive (GMR), tunneling magnetoresistive (TuMR), other magnetoresistive technologies, or other suitable technologies.

The head unit under the slider 526 is connected to a preamplifier 530, which is interconnected with the control electronics 520 of the hard disk drive 500 by a flex cable 532 that is typically mounted on the actuator arm assembly 512. Signals are exchanged between the head unit and its corresponding data storage disk 506 for hard disk drive read/write operations. In this regard, the voice coil motor 518 is utilized to pivot the actuator arm assembly 512 to simultaneously move the slider 526 along a path 534 and across the corresponding data storage disk 506 to position the head unit at the appropriate position on the data storage disk 506 for hard disk drive read/write operations.

When the hard disk drive 500 is not in operation, the actuator arm assembly 512 is pivoted to a "parked position" to dispose each slider 526 generally at or beyond a perimeter of its corresponding data storage disk 506, but in any case in vertically spaced relation to its corresponding data storage disk 506. In this regard, the hard disk drive 500 includes a ramp assembly (not shown) that is disposed beyond a perimeter of the data storage disk 506 to both move the corresponding slider 526 vertically away from its corresponding data storage disk 506 and to also exert somewhat of a retaining force on the actuator arm assembly 512.

Exposed contacts 536 of a drive connector 538 along a side end of the hard disk drive 500 may be used to provide connectivity between circuitry of the hard disk drive 500 and a next level of integration such as an interposer, a circuit board, a cable connector, or an electronic assembly. The drive connector 538 may include jumpers (not shown) or switches (not shown) that may be used to configure the hard disk drive 500 for user specific features or configurations. The jumpers or switches may be recessed and exposed from within the drive connector 538.

As such, provided herein is an apparatus, comprising an annular disk clamp including an inner perimeter; a lock ring including an inner perimeter; and an annular seat in an outer perimeter of a hub configured to receive each of the annular disk clamp and the lock ring; wherein the inner perimeter of each of the annular disk clamp and the lock ring is configured to fit over the outer perimeter of the hub, and wherein the annular disk clamp and the lock ring, in combination, are configured to sit wholly above the at least one disk and clamp the at least one disk onto the hub at a mounting point on the hub for the at least one disk. In some embodiments, the annular disk clamp is configured to fit over the outer perimeter of the hub by an interference fit. In some embodiments, the lock ring is configured to fit over the outer perimeter of the hub by an interference fit. In some embodiments, the lock ring comprises a means for locking and unlocking the lock ring. In some embodiments, the lock ring comprises plastic, aluminum, or steel. In some embodiments, the combination of the annular disk clamp and the lock ring comprise the lock ring atop the annular disk clamp in the annular seat in the outer perimeter of a hub. In some embodiments, an outer annulus of the disk clamp applies a uniform pressure on an inner annulus of the at least one disk directly overlying the mounting point. In some embodiments, the at least one disk tops a disk stack comprising a plurality of disks alternately stacked with spacer rings.

Also provided herein is an apparatus, comprising an annular disk clamp including an inner perimeter a lock ring including an inner perimeter; and an annular seat in an outer perimeter of a hub configured to receive each of the annular disk clamp and the lock ring; and wherein the inner perimeter of each of the annular disk clamp and the lock ring is configured to fit over the outer perimeter of the hub by an interference fit, and wherein the annular disk clamp and the lock ring, in combination with the lock ring atop the annular disk clamp, are configured to sit wholly above the at least one disk and clamp the at least one disk onto the hub at a mounting point on the hub for the at least one disk. In some embodiments, the lock ring comprises a means for locking and unlocking the lock ring. In some embodiments, the lock ring comprises plastic, aluminum, or steel. In some embodiments, an outer annulus of the disk clamp applies a uniform pressure on an inner annulus of the at least one disk directly overlying the mounting point. In some embodiments, the at least one disk tops a disk stack comprising a plurality of disks alternately stacked with spacer rings.

Also provided herein is an apparatus, comprising a disk clamp including an inner perimeter; a lock including an inner perimeter and a means for locking and unlocking the lock; a seat in an outer perimeter of a hub configured to receive at least one of the disk clamp or the lock; and wherein the disk clamp and the lock, in combination with the lock atop the disk clamp, are configured to sit wholly above the at least one disk and clamp the at least one disk onto the hub at a mounting point on the hub for the at least one disk. In some embodiments, the means for locking and unlocking the lock comprises a fastening and unfastening two arms of the lock together with a removable fastener. In some embodiments, the lock comprises a temperature-dependent material, and the means for locking and unlocking the lock comprises application of different temperatures. In some embodiments, the lock comprises an expandable body, and the means for locking and unlocking the lock comprises expanding and relaxing the lock. In some embodiments, the lock ring comprises plastic, aluminum, or steel. In some embodiments, an outer portion of the disk clamp applies a uniform pressure on an inner annulus of the at least one disk directly overlying the mounting point. In some embodiments, the at least one disk tops a disk stack comprising a plurality of disks alternately stacked with spacer rings.

Also provided herein is apparatus, comprising a clamping means for clamping at least one disk onto a hub at a mounting point on the hub for the at least one disk, wherein the clamping means is configured to sit wholly above the at least one disk; a seat in an outer perimeter of the hub configured to receive the clamping means; and a locking means for locking the clamping means onto the hub. In some embodiments, the clamping means applies a uniform pressure on an inner annulus of the at least one disk at the mounting point on the hub for the at least one disk. In some embodiments, the clamping means and the locking means, in combination with the locking means atop the clamping means, are configured to sit wholly above the at least one disk. In some embodiments, the locking means is configured to lock the clamping means onto the hub by means of two arms configured to be fastened together with a fastener. In some embodiments, the locking means is configured to lock the clamping means onto the hub using by means of a temperature-dependent material configured to expand upon heating and to contract upon cooling. In some embodiments, the locking means is configured to lock the clamping means onto the hub by means of an interference fit on the hub. In some embodiments, the clamping means comprises the locking means, and the clamping means comprising the locking means is configured to sit wholly above the at least one disk.

While the invention has been described and/or illustrated by means of various embodiments and/or examples, and while these embodiments and/or examples have been described in considerable detail, it is not the intention of the applicant(s) to restrict or in any way limit the scope of the invention to such detail. Additional adaptations and/or modifications of embodiments of the invention may readily appear to persons having ordinary skill in the art to which the invention pertains, and, in its broader aspects, the invention may encompass these adaptations and/or modifications. Accordingly, departures may be made from the foregoing embodiments and/or examples without departing from the scope of the invention, which scope is limited only by the following claims when appropriately construed.

What is claimed is:

1. An apparatus, comprising:
    an annular disk clamp including an inner perimeter;
    a lock ring including an inner perimeter; and
    an annular seat in an outer perimeter of a hub configured to receive each of the annular disk clamp and the lock ring;
    wherein the annular disk clamp is entirely below the lock ring,
    wherein the inner perimeter of each of the annular disk clamp and the lock ring is configured to fit over the outer perimeter of the hub, and wherein the annular disk clamp and the lock ring, in combination, are configured to sit wholly above at least one disk and further configured to clamp the at least one disk onto the hub at a mounting point on the hub for the at least one disk.

2. The apparatus of claim 1, wherein the annular disk clamp is configured to fit over the outer perimeter of the hub by an interference fit.

3. The apparatus of claim 2, wherein the lock ring is configured to fit over the outer perimeter of the hub by an interference fit.

4. The apparatus of claim 1, wherein the lock ring comprises a means for locking and unlocking the lock ring.

5. The apparatus of claim 1, wherein the lock ring comprises plastic, aluminum, or steel.

6. The apparatus of claim 1, wherein the combination of the annular disk clamp and the lock ring comprise the lock ring atop the annular disk clamp in the annular seat in the outer perimeter of the hub.

7. The apparatus of claim 1, wherein an outer annulus of the annular disk clamp applies a uniform pressure on an inner annulus of the at least one disk directly overlying the mounting point.

8. The apparatus of claim 7, wherein the at least one disk tops a disk stack comprising a plurality of disks alternately stacked with spacer rings.

* * * * *